United States Patent
Hayashi et al.

(10) Patent No.: US 7,221,521 B2
(45) Date of Patent: *May 22, 2007

(54) OPTICAL PICKUP LENS DEVICE AND INFORMATION RECORDING AND REPRODUCING DEVICE USING THE SAME

(75) Inventors: Katsuhiko Hayashi, Katano (JP);
Yasuhiro Tanaka, Nishinomiya (JP);
Michihiro Yamagata, Osaka (JP);
Yoshiaki Komma, Hirakata (JP);
Fumitomo Yamasaki, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/385,829

(22) Filed: Mar. 22, 2006

(65) Prior Publication Data

US 2006/0164735 A1 Jul. 27, 2006

Related U.S. Application Data

(62) Division of application No. 10/535,339, filed as application No. PCT/JP2004/010159 on Jul. 9, 2004, now Pat. No. 7,068,445.

(30) Foreign Application Priority Data

Jul. 11, 2003 (JP) ............................. 2003-195582
May 6, 2004 (JP) ............................. 2004-137594

(51) Int. Cl.
*G02B 13/18* (2006.01)
*G02B 3/02* (2006.01)
*G11B 7/00* (2006.01)
*G11B 7/135* (2006.01)

(52) U.S. Cl. .................................. 359/719; 369/112.03
(58) Field of Classification Search ........ 359/718–719, 359/741, 708, 754, 793; 369/44.32, 44.33, 369/112.03, 112.05, 112.06
See application file for complete search history.

(56) References Cited

FOREIGN PATENT DOCUMENTS

| GB | EP1102251 A2 * | 5/2001 |
|---|---|---|
| JP | 64-019316 A | 1/1989 |
| JP | 7-294707 A | 11/1995 |
| JP | 11-337818 A | 12/1999 |
| JP | 2001-067701 A | 3/2001 |
| JP | 2003-059080 A | 2/2003 |
| JP | 2003-084196 A | 3/2003 |
| JP | 2004-071134 A | 3/2004 |

* cited by examiner

*Primary Examiner*—Alicia M Harrington
(74) *Attorney, Agent, or Firm*—McDermott Will & Emery LLP

(57) ABSTRACT

An optical pickup lens device includes, in the order from the light source side, a collimating lens for converting a bundle of rays into parallel rays or predetermined convergent or divergent rays, the collimating lens being movably held along a direction of an optical axis of a bundle of rays emitted from a light source; an aberration correcting element for allowing a bundle of rays emitted from the collimating lens to be transmitted therethrough; and an objective lens element having a numerical aperture of 0.8 or more, and converging a bundle of rays coming from the aberration correcting element onto the information recording medium to form a spot. The aberration correcting element and the objective lens element are integrally held together in a direction orthogonal to the optical axis so as to perform tracking on the information recording medium, and satisfy predetermined conditions.

4 Claims, 10 Drawing Sheets

OPTICAL PICKUP LENS DEVICE AND INFORMATION RECORDING AND REPRODUCING DEVICE USING THE SAME

RELATED APPLICATIONS

This application is a divisional of U.S. application Ser. No. 10/535,339, filed on May 18, 2005, now U.S. Pat. No. 7,068,445 which is the U.S. National Phase under 35 U.S.C. § 371 of International Application No. PCT/JP2004/010159, filed on Jul. 9, 2004, which in turn claims the benefit of Japanese Application No. 2003-195582, filed on Jul. 11, 2003 and Japanese Application No. 2004-137594, filed on May 6, 2004, the disclosures of which Applications are incorporated by reference herein.

TECHNICAL FIELD

The present invention relates to an optical pickup lens device, and in particular to an optical pickup lens device applicable to high-density recordable optical information recording devices such as DVD (Digital Versatile Disk) devices which use a bundle of rays with wavelengths of 390 nm to 420 nm, and optical recording devices for computers. In addition, the present invention relates to an information recording and reproducing device having the aforementioned optical pickup lens device.

BACKGROUND ART

Conventionally, an optical pickup lens device is used under conditions in which the wavelength of a light source is 650 nm or more and the numerical aperture of an objective lens element is such that NA=on the order of 0.6; therefore the amount of displacement of a spot caused by axial chromatic aberration or magnification chromatic aberration is not likely to cause problems.

In recent years, however, along with an increase in the capacity of information recording media, there have been developments in the shortening of the wavelength of a light source and the increase of NA (numerical aperture) in an optical information recording device. In such a short-wavelength region, since the dispersion of an optical material such as a lens element is very large, a slight change in the wavelength of a bundle of rays significantly changes the refractive index of the optical material. Accordingly, in recent optical pickup lens devices, it is necessary to consider chromatic aberration correction.

Particularly, in an optical information recording device of DVD±RW, etc., which are currently widely used in a DVD recorder, etc., since the recording and erasing of information are performed using a phase change in a medium, the optical power used when writing or erasing information is made different from the optical power used when reading written information. Thus, in an optical information recording device using a phase-transition medium, it is not possible, in principle, to avoid the wavelengths of a bundle of rays emitted by the light source from significantly changing upon switching between recording or erasing and reproduction.

Hence, in an optical information recording device using a phase-transition medium, chromatic aberration correction in an optical pickup lens device is a critical problem for the following reason. In an optical pickup device using a phase-transition medium, if the chromatic aberration in the lens device is not corrected, a steep focus position change occurs due to the change in wavelength emitted by the light source, and consequently, focus control may not be performed.

Conventionally, in order to suppress such chromatic aberration, as described in Japanese Laid-Open Patent Publications No. 64-19316, No. 7-294707, and No. 11-337818, there have been proposed techniques such as a technique of allowing an objective lens element to have chromatic aberration correction functionality, a technique of allowing a collimating lens disposed between a light source and an objective lens element to have chromatic aberration correction functionality, a technique of additionally inserting a chromatic aberration correcting element in an optical path to excessively correct chromatic aberration, and thereby canceling out chromatic aberration in an objective lens element.

DISCLOSURE OF THE INVENTION

However, conventional structures which realize chromatic aberration correction are not satisfactory for an optical pickup lens device which uses a high-density recordable information recording medium in which the spot diameter is very small and the track width is very narrow.

An object of the present invention is to provide an optical pickup lens device capable of performing stable tracking while having large chromatic aberration correction functionality, and an information recording and reproducing device using the optical pickup lens device.

One of the aforementioned objects is achieved by the following optical pickup lens device. An optical pickup lens device used in an optical pickup device which performs at least one of reading, writing, and erasing of information by converging onto an information recording medium a bundle of rays with wavelengths of from 390 nm to 420 nm emitted from a light source, to form a spot, comprises, in an order from a side of the light source: collimating means for converting the bundle of rays into parallel rays or predetermined convergent or divergent rays, the collimating means being movably held a long a direction of an optical axis of the bundle of rays emitted from the light source; an aberration correcting element for allowing a bundle of rays emitted from the collimating means to be transmitted therethrough; and an objective lens element having a numerical aperture of 0.8 or more, and converging a bundle of rays coming from the aberration correcting element onto the information recording medium to form a spot, wherein the aberration correcting element and the objective lens element are integrally held together in a direction orthogonal to the optical axis so as to perform tracking on the information recording medium, and the optical pickup lens device satisfies the following conditions:

$$-0.1 \leq CAt \leq 0.1 \tag{1};$$

$$-20 \leq CAf \leq 20 \tag{2};$$

$$-20 \leq CAm \leq 0 \tag{3};$$

$$-0.25 \leq \theta f \leq 0.25 \tag{4; and}$$

$$-0.75 \leq \theta m \leq 0.75 \tag{5},$$

where

CAt: axial chromatic aberration (μm/nm) in an entire optical system,

CAf: axial chromatic aberration (μm/nm) in the collimating means,

CAm: axial chromatic aberration (μm/nm) in the aberration correcting element,

θf: amount of change in an angle of a bundle of outgoing rays from the collimating means per unit wavelength (min/nm), and θm: amount of change in an angle of a bundle of outgoing rays from the aberration correcting element per unit wavelength (min/nm).

Preferably, the aberration correcting element is a diffractive lens having an optical power to deflect a bundle of rays by diffraction. Alternatively, the aberration correcting element preferably has a phase step surface including a plurality of zone regions defined by concentric circles with the optical axis being at a center; and phase steps each formed at a boundary portion between the regions.

One of the aforementioned objects is achieved by the following optical pickup device. An optical pickup device which performs at least one of reading, writing, and erasing of information by converging a bundle of rays onto an information recording medium to form a spot, comprises: a light source for emitting a bundle of rays with a wavelength range of 390 nm to 420 nm; collimating means for converting the bundle of rays into parallel rays or predetermined convergent or divergent rays, the collimating means being movably held along a direction of an optical axis of the bundle of rays emitted from the light source; an aberration correcting element for allowing a bundle of rays emitted from the collimating means to be transmitted therethrough; and an objective lens element having a numerical aperture of 0.8 or more, and converging a bundle of rays coming from the aberration correcting element onto the information recording medium to form a spot, wherein the aberration correcting element and the objective lens element are integrally held together in a direction orthogonal to the optical axis so as to perform tracking on the information recording medium, and the optical pickup device satisfies the following conditions:

$$-0.1 \leq CAt \leq 0.1 \quad (1);$$

$$-20 \leq CAf \leq 20 \quad (2);$$

$$-20 \leq CAm \leq 0 \quad (3);$$

$$-0.25 \leq \theta f \leq 0.25 \quad (4); \text{ and}$$

$$-0.75 \leq \theta m \leq 0.75 \quad (5),$$

where

CAt: axial chromatic aberration (μm/nm) in an entire optical system,

CAf: axial chromatic aberration (μm/nm) in the collimating means,

CAm: axial chromatic aberration (μm/nm) in the aberration correcting element,

θf: amount of change in an angle of a bundle of outgoing rays from the collimating means per unit wavelength (min/nm), and θm: amount of change in an angle of a bundle of outgoing rays from the aberration correcting element per unit wavelength (min/nm).

According to the present invention, an optical pickup lens device capable of performing stable tracking while having large chromatic aberration correction functionality, and an information recording and reproducing device using the optical pickup lens device can be provided.

BEST MODE FOR CARRYING OUT THE INVENTION

FIRST EMBODIMENT

Figure 1:
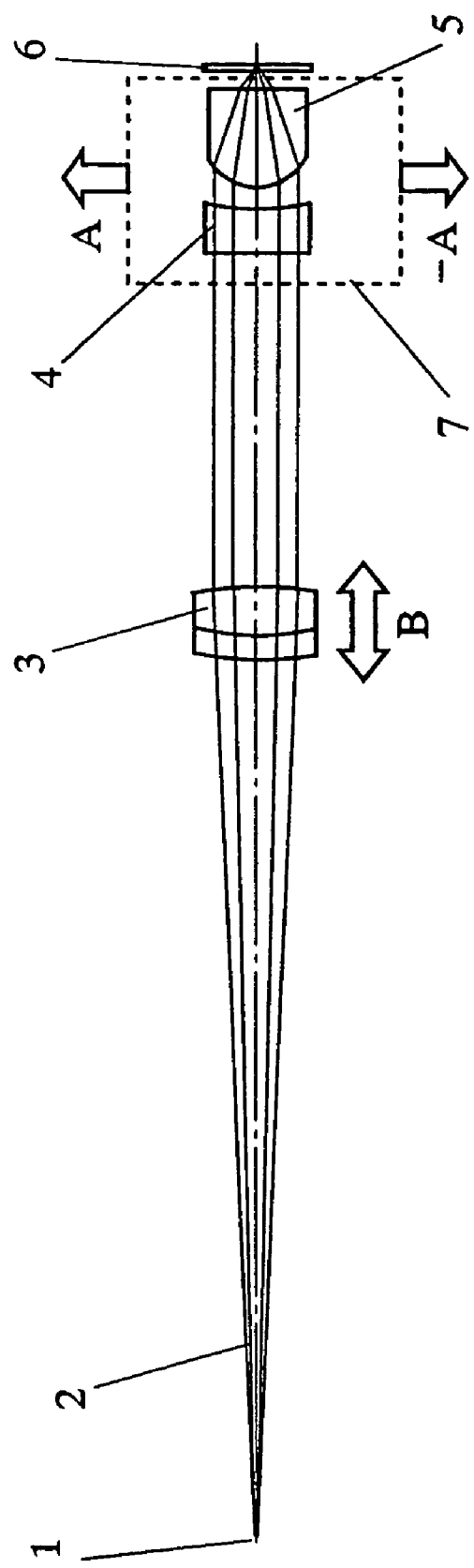
FIG. 1 is a basic schematic structure diagram of an optical pickup device in a first embodiment of the present invention.

FIG. 1 is a schematic structure diagram of an optical pickup lens device according to a first embodiment of the present invention. The optical pickup lens device according to the first embodiment includes a light source 1, a collimating lens 3 (collimating means), a diffractive lens 4 (an aberration correcting element), an objective lens 5, and an actuator 7. The light source 1 is composed of a semiconductor laser and emits a bundle of rays 2 with wavelengths ranging from 390 nm to 420 nm.

In FIG. 1, the bundle of rays 2 coming from the light source 1 composed of a semiconductor laser become substantially parallel rays through the collimating lens 3. Then, the rays are transmitted through the diffractive lens 4 and then converged onto an information recording medium 6 by the objective lens 5.

Here, the diffractive lens 4 along with the objective lens 5 are mounted on the actuator 7 such that their optical axes are substantially aligned with each other, whereby the diffractive lens 4 and the objective lens 5 are movable in directions perpendicular to the optical axis direction, as shown by arrows A and −A. Accordingly, even if the wavelength is changed and a bundle of rays diverge or converge, compensation for displacement of a spot in a track direction, i.e., tracking, can be performed.

The collimating lens 3 is composed of a cemented achromatic lens and is movable in the optical axis direction, as shown by arrow B, so that spherical aberration occurring in an optical system can be corrected. By this, the angle of a bundle of rays entering the objective lens 5 can be changed, whereby spherical aberration caused due to the difference in the thickness of the information recording medium 6 or due to each optical element composing the optical system, can be canceled out.

The optical pickup lens device according to the first embodiment satisfies the following conditions:

$$-0.1 < CAt \leq 0.1 \quad (1);$$

$$-20 \leq CAf \leq 20 \quad (2);$$

$$-20 \leq CAm \leq 0 \quad (3);$$

$$-0.25 \leq \theta f \leq 0.25 \quad (4); \text{ and}$$

$$-0.75 \leq \theta m \leq 0.75 \quad (5),$$

where

CAt: axial chromatic aberration in the entire optical system (μm/nm),

CAf: axial chromatic aberration in the collimating means (μm/nm),

CAm: axial chromatic aberration in the aberration correcting element (μm/nm),

θf: amount of change in the angle of a bundle of outgoing rays from the collimating means per unit wavelength (min/nm), and θm: amount of change in the angle of a bundle of outgoing rays from the aberration correcting element per unit wavelength (min/nm).

If CAt, the axial chromatic aberration in the entire optical system, is smaller than −0.1 (μm/nm) or greater than 0.1 (μm/nm), because the amount of movement of the spot in the optical axis direction caused by a wavelength change is great, it is difficult to perform stable recording or reproduction and thus it is not desirable.

If the axial chromatic aberration in the collimating means CAf is smaller than −20 (μm/nm), when the axial chromatic aberration in the aberration correcting element CAm is 0, the amount of displacement of the spot exceeds 10 nm, and thus it is not desirable. If the axial chromatic aberration in the collimating means CAf is greater than 20 (μm/nm), it becomes difficult to satisfy the aforementioned condition (1) with the aberration correcting element, and thus it is not desirable.

If the axial chromatic aberration in the aberration correcting element CAm is smaller than −20 (μm/nm), even if the collimating means is in chromatic aberration undercorrection condition, the aforementioned expression (1) cannot be satisfied and thus it is not desirable. If the axial chromatic aberration in the aberration correcting element CAm is greater than 0, chromatic aberration in the objective lens element cannot be corrected and thus it is not desirable.

If the amount of change in the angle of a bundle of outgoing rays from the collimating means per unit wavelength θf is smaller than −0.25 (min/nm) or greater than 0.25 (min/nm), even if chromatic aberration in the aberration correcting element is 0, the amount of displacement of the spot exceeds 10 nm, and thus it is not desirable.

If the amount of change in the angle of a bundle of outgoing rays from the aberration correcting element per unit wavelength θm is smaller than −0.75 (min/nm) or greater than 0.75 (min/nm), the magnification of the optical system greatly varies from the numerical aperture NA of the objective lens element, and thus it is not desirable in terms of the structure of the optical pickup device.

Figure 6:
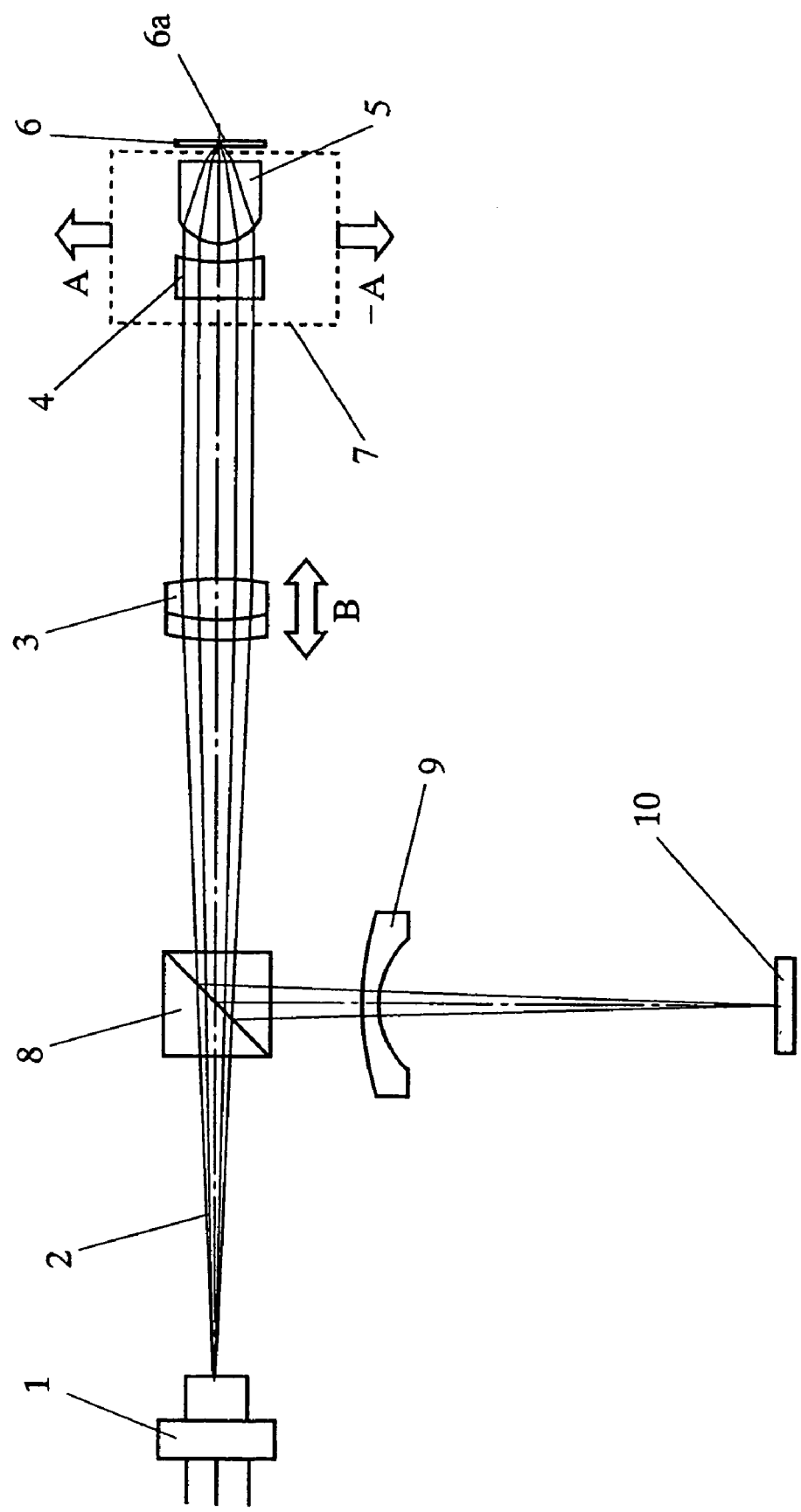
FIG. 6 is a schematic structure diagram of the optical pickup device in the first embodiment of the present invention.

FIG. 6 is a schematic structure diagram of an optical pickup device to which the optical pickup lens device according to the first embodiment of the present invention is applied. In FIG. 6, the same components as those in FIG. 1 are designated by the same reference numerals. In FIG. 6, a bundle of rays coming from a light source 1 composed of a semiconductor laser are transmitted through a beam splitter 8 and then become substantially parallel rays through a collimating means 3 composed of a collimating lens. Then, the rays are transmitted through an aberration correcting element 4 composed of a diffractive lens, and then converged onto an information recording surface 6a of an information recording medium 6 by an objective lens 5. A convergence spot where the bundle of rays are converged onto the information recording surface 6a is reflected by pits formed on the information recording surface 6a and having different reflectivities, and the reflected laser light is transmitted through the objective lens 5, the aberration correcting element 4, and the collimating means 3, and reflects by the beam splitter 8, and refracts at a detection lens 9, and then is converged onto a light receiving element 10. Using an electrical signal from the light receiving element 10, the change in the amount of light modulated at the information recording surface 6a is detected, and data recorded on the information recording medium 6 is read.

Here, the aberration correcting element 4 and the objective lens 5 are both mounted on an actuator 7 and are movable in directions of arrows A and −A, i.e., in a direction orthogonal to the optical axis direction, and the collimating means 3 is movable in the optical axis direction, as shown by arrow B.

Note that, in the first embodiment, the collimating lens is composed of a cemented lens, but maybe composed of a diffractive lens with color correction functionality or a single lens with no color correction functionality. In addition, the aberration correcting element is composed of a diffractive lens, but may be composed of a cemented lens with chromatic aberration correction functionality. However, since a diffractive lens can be formed of a resin and thus is light in weight, it is advantageous to mount a diffractive lens along with an objective lens on an actuator and allow them to move.

Note also that the aberration correcting element, i.e., a diffractive lens, and the objective lens are configured separately, but may be configured integrally such that at least one surface of the objective lens has a diffraction structure.

FIRST NUMERICAL EXAMPLE

Now, a numerical example which concretely shows the optical pickup lens device according to the first embodiment is described along with a comparative example. A first example and the comparative example are different only in the design values of a collimating lens 3 and a diffractive lens 4. In the first example and the comparative example, although both examples have the same axial chromatic aberration in the entire optical system of 0.09 μm/nm, axial chromatic aberration and the amount of change in outgoing angle for the collimating lens 3 are different from those for the diffractive lens 4, and thus the amount of displacement of the spot is significantly different for each example.

A specific numerical structure of a collimating lens 3, a diffractive lens 4, and an objective lens 5 of the first example is shown in Table 1, and similarly, a numerical structure of the comparative example is shown in Table 2. In each example, the center design wavelength is 410 nm. In addition, in the first example and the comparative example, parallel beams are assumed to enter the diffractive lens 4, and the diameter of the parallel beams on the outgoing side is set to 2.21 mm. Surface numbers 1 to 4 represent the collimating lens 3, surface numbers 5 to 8 represent the diffractive lens 4, surface numbers 9 and 10 represent the objective lens 5, and surface numbers 11 and 12 represent a protective layer of an information recording medium 6 which is a medium. Note that r represents the radius of curvature of each lens surface (a protective layer surface for the information recording medium), d represents the lens thickness, nλ represents the refractive index of each lens at a wavelength of λ nm, and ν represents the Abbe constant of each lens. A phase grating formed on a diffractive surface is represented by an ultra-high refractive index method (for the ultra-high refractive index method, see William C. Sweatt: Describing holographic optical elements as lenses: Journal of Optical Society of America, Vol. 67, No. 6, June 1977).

The aspherical shape is given by the following (Eq. 1):

$$X = \frac{C_j h^2}{1 + \sqrt{1 - (1 + k_j)C_j^2 h^2}} + \sum A_{j,n} h^n \quad \text{(Eq. 1)}$$

The meaning of each symbol is as follows:

X: distance of a point on an aspherical surface whose height from the optical axis is h, from a plane tangent to the vertex of the aspherical surface, h: height from the optical axis, $C_j$: curvature of the j-th surface of the objective lens at the vertex of the aspherical surface ($C_j=1/R_j$), $K_j$: conic constant of the j-th surface of the objective lens, and $A_{j, n}$: n-th order aspherical coefficient of the j-th surface of the objective lens, where j=13, 14.

TABLE 1

| | Surface no. | r | d | n410 | νd |
|---|---|---|---|---|---|
| Object point | 1 | — | 6.114 | | |
| | 2 | Plane | 4.250 | 1.52957 | 64.2 |
| | 3 | Plane | 1.100 | 1.56124 | 69.5 |
| | 4 | — | 5.793 | | |
| Collimating lens | 5 | 84.725 | 0.500 | 1.73959 | 30.1 |
| | 6 | 12.469 | 0.000 | | |
| | 7 | 12.469 | 1.000 | 1.68490 | 55.4 |
| | 8 | −12.037 | 5.207 | | |
| Diffractive lens | 9 | 75113.020 | 0.000 | 4101.03141 | −3.5 |
| | 10 | Plane | 0.000 | | |
| | 11 | Plane | 0.500 | 1.52256 | 56.4 |
| | 12 | 9.402 | 2.000 | | |
| Objective lens | 13 | 1.097 | 1.907 | 1.77717 | 45.6 |
| | 14 | −3.126 | 0.252 | | |
| Disk | 15 | Plane | 0.100 | 1.61580 | 30.1 |
| | 16 | Plane | | | |

| | |
|---|---|
| K13 | −0.843174 |
| A13, 4 | 0.034142332 |
| A13, 6 | 0.036644763 |
| A13, 8 | −0.09167153 |
| A13, 10 | 0.14483359 |
| A13, 12 | −0.07839237 |
| A13, 14 | −0.01510398 |
| A13, 16 | 0.017046335 |
| K14 | 33.80017 |
| A14, 4 | 0.25550467 |
| A14, 6 | 14.441438 |
| A14, 8 | −164.31079 |
| A14, 10 | 722.07909 |
| A14, 12 | −732.06737 |
| A14, 14 | −3351.5353 |
| A14, 16 | 7740.7264 |

TABLE 2

| | Surface no. | r | d | n410 | νd |
|---|---|---|---|---|---|
| Object point | 1 | — | 6.036 | | |
| | 2 | Plane | 4.25 | 1.52957 | 64.2 |
| | 3 | Plane | 1.1 | 1.56124 | 69.5 |
| | 4 | — | 5.773 | | |

TABLE 2-continued

| | Surface no. | r | d | n410 | νd |
|---|---|---|---|---|---|
| Collimating lens | 5 | 42.891 | 0.500 | 1.73959 | 30.1 |
| | 6 | 2.200 | 0.000 | | |
| | 7 | 2.200 | 1.000 | 1.68490 | 55.4 |
| | 8 | −10.000 | 5.227 | | |
| Diffractive lens | 9 | 191418.600 | 0.000 | 4101.03141 | −3.45 |
| | 10 | 0.000 | 0.000 | | |
| | 11 | 0.000 | 0.500 | 1.52256 | 56.4 |
| | 12 | 24.225 | 2.000 | | |
| Objective lens | 13 | 1.097 | 1.907 | 1.77717 | 45.6 |
| | 14 | −3.126 | 0.252 | | |
| Disk | 15 | Plane | 0.100 | 1.61580 | 30.1 |
| | 16 | Plane | | | |

| | |
|---|---|
| K13 | −0.843174 |
| A13, 4 | 0.034142332 |
| A13, 6 | 0.036644763 |
| A13, 8 | −0.09167153 |
| A13, 10 | 0.14483359 |
| A13, 12 | −0.07839237 |
| A13, 14 | −0.01510398 |
| A13, 16 | 0.017046335 |
| K14 | 33.80017 |
| A14, 4 | 0.25550467 |
| A14, 6 | 14.4414381 |
| A14, 8 | −164.31079 |
| A14, 10 | 722.07909 |
| A14, 12 | −732.06737 |
| A14, 14 | −3351.5353 |
| A14, 16 | 7740.7264 |

Figure 2B:
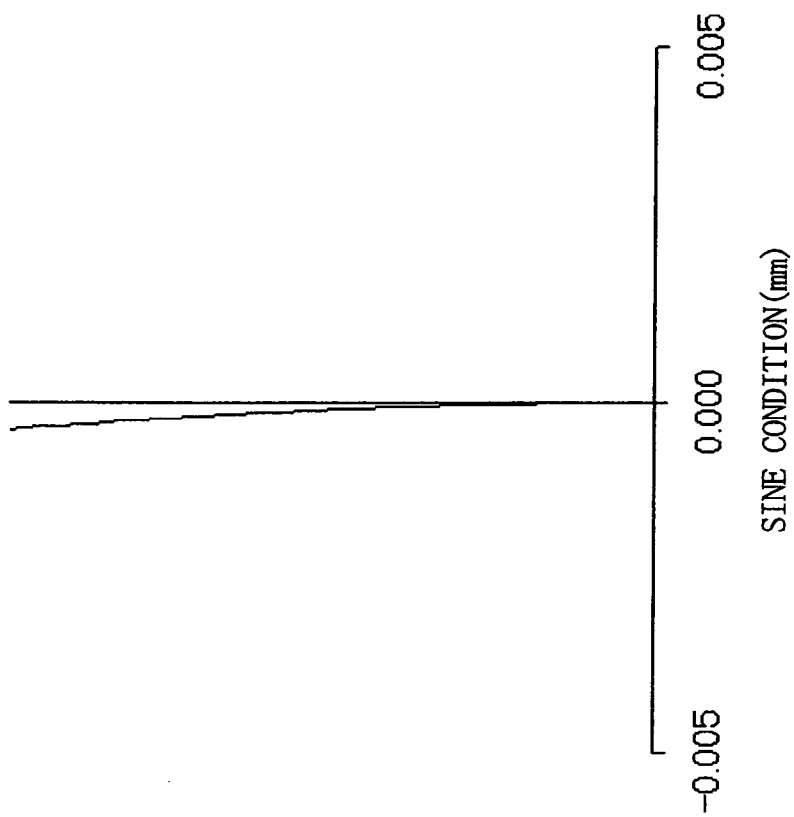
FIGS. 2 are diagrams showing aberration in a collimating lens of a first example in the first embodiment of the present invention.
Figure 2A:
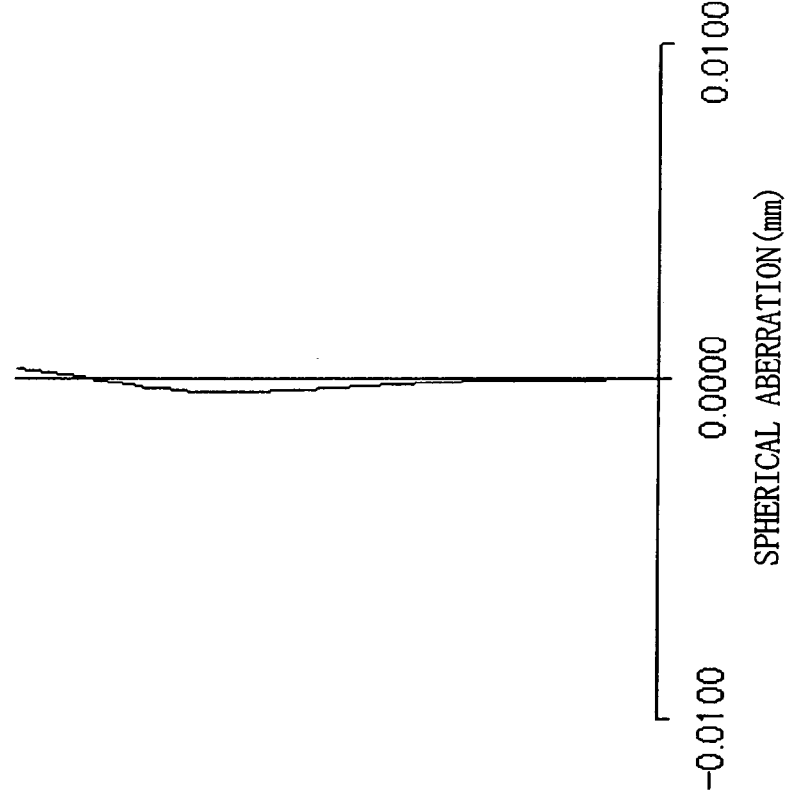
Figures 3A, 3B:
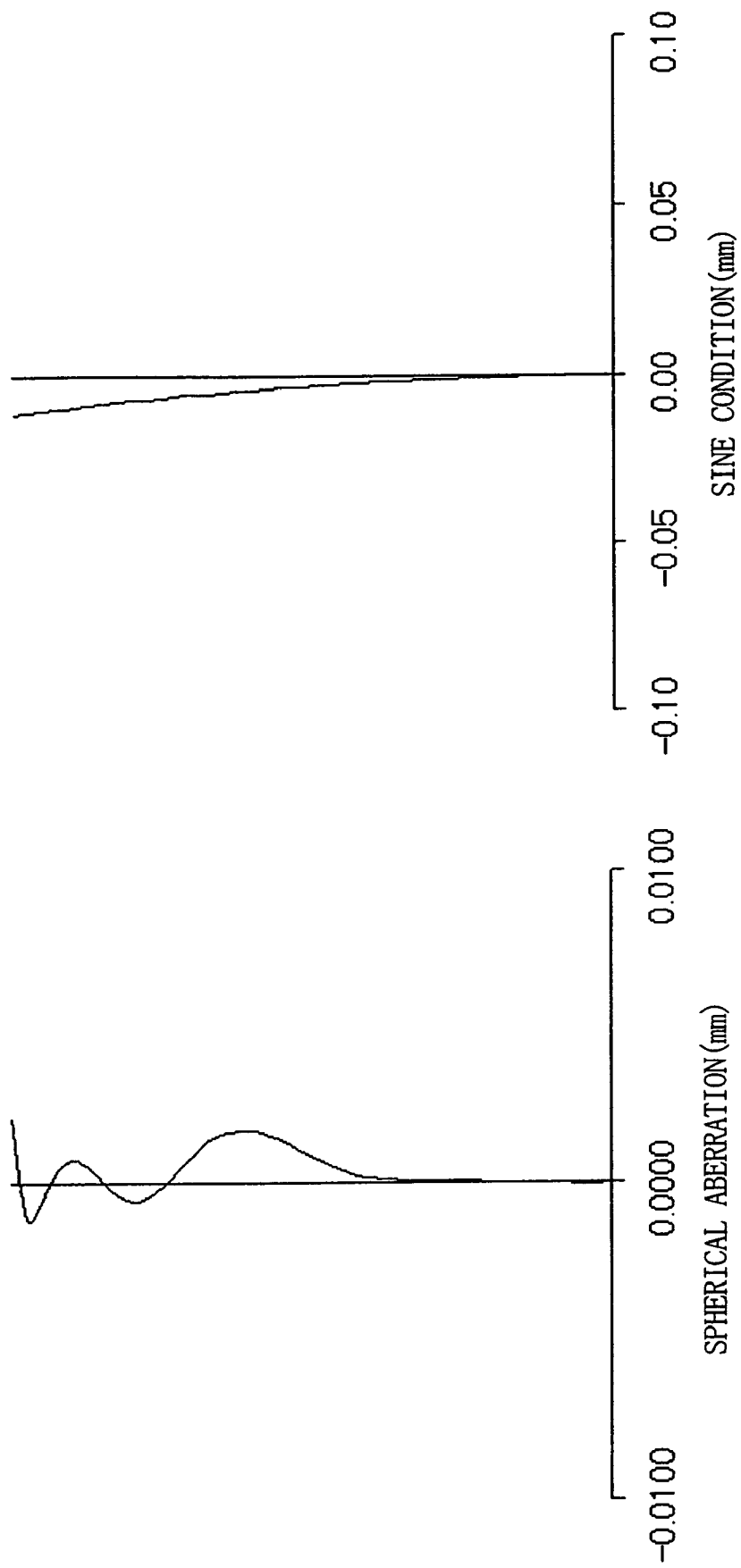
FIGS. 3 are diagrams showing aberration in a diffractive lens of the first example in the first embodiment of the present invention.

Aberration in the collimating lens 3 of the first example is shown in FIG. 2. FIG. 2(a) shows spherical aberration SA and FIG. 2(b) shows the amount of offense against sine condition SC. Further, aberration in the diffractive lens 4 which is an aberration correcting element of the first example is shown in FIG. 3. FIG. 3(a) shows spherical aberration SA and FIG. 3(b) shows the amount of offense against sine condition SC.

As shown in FIG. 2(a), the spherical aberration SA in the collimating lens 3 is substantially favorably corrected. In addition, as shown in FIG. 2(b), the sine condition SC is also substantially corrected.

Figure 4B:
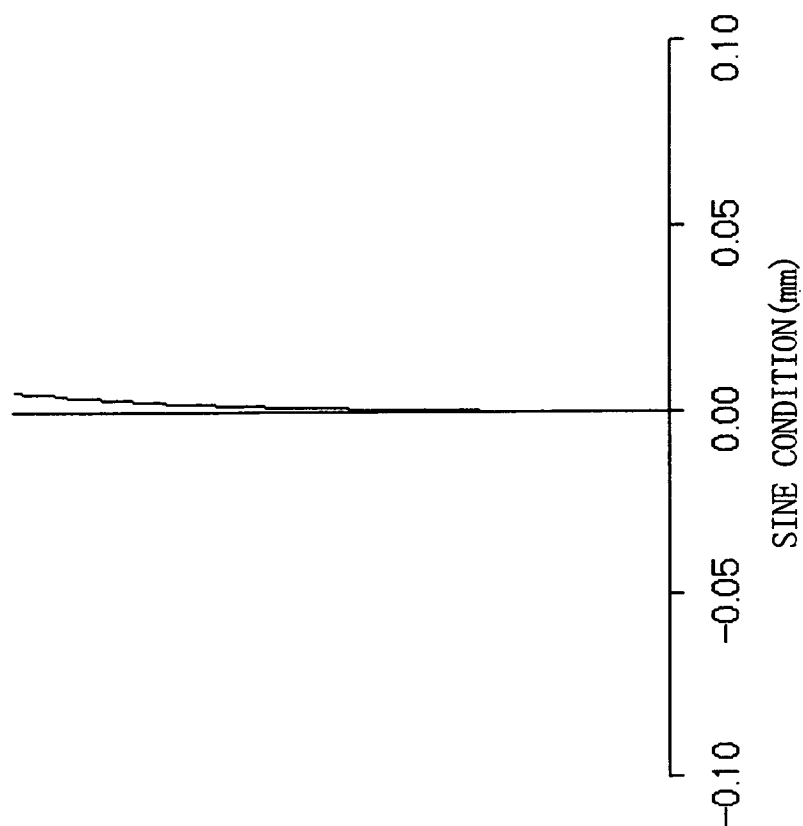
FIGS. 4 are diagrams showing aberration in a collimating lens of a comparative example in the first embodiment of the present invention.
Figure 4A:
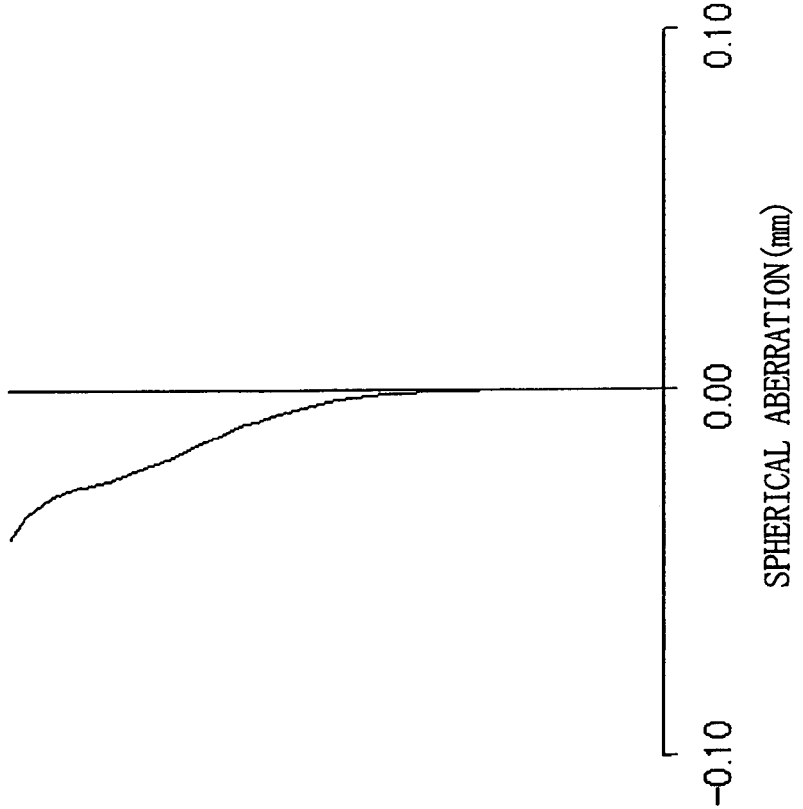
Figures 5A, 5B:
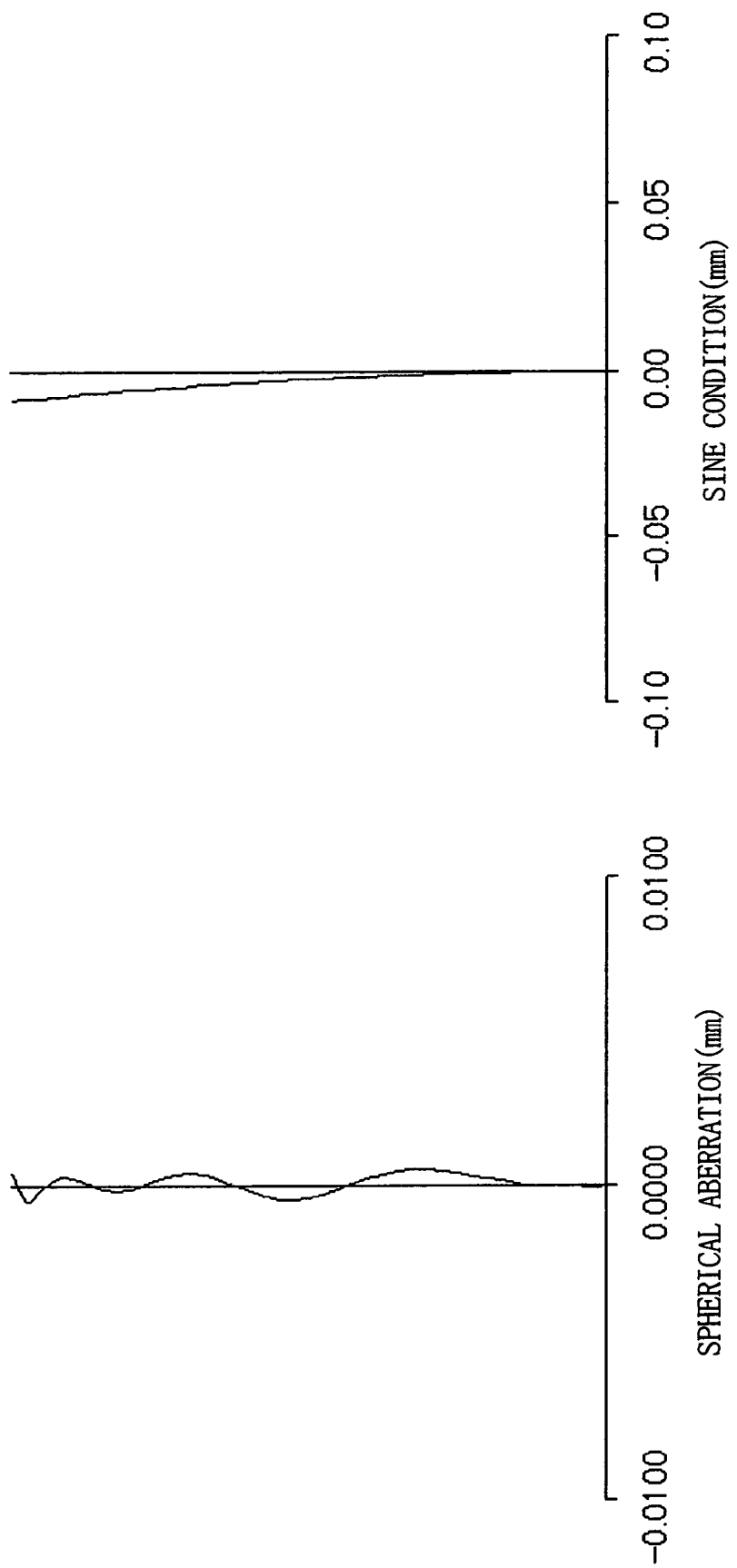
FIGS. 5 are diagrams showing aberration in a diffractive lens of the comparative example in the first embodiment of the present invention.

Aberration in the collimating lens 3 of the comparative example is shown in FIG. 4. As shown in FIG. 4(a), spherical aberration SA in the collimating lens 3 is substantially favorably corrected. Similarly, as shown in FIG. 4(b), sine condition SC is also favorably corrected. Aberration in the diffractive lens 4 of the comparative example is shown in FIG. 5. As shown in FIG. 5(a), spherical aberration SA in the diffractive lens 4 is substantially favorably corrected; similarly, as shown in FIG. 5(b), sine condition SC is also favorably corrected.

Table 3 shows the focal length, effective aperture, and axial chromatic aberration for each of the collimating lens 3, the diffractive lens 4, and the objective lens 5, and axial chromatic aberration in the entire optical system, for the first example and the comparative example.

TABLE 3

| | | Collimating lens | Diffractive lens | Objective lens | Entire optical system | Unit |
|---|---|---|---|---|---|---|
| | Focal length | 16.4 | Afocal | 1.3 | | mm |
| | Effective aperture | 2.80 | 3.00 | 2.21 | | mm |
| 1st ex | Axial chromatic aberration | −0.05 | −15.66 | 0.29 | 0.09 | μm/nm |

TABLE 3-continued

|  |  | Collimating lens | Diffractive lens | Objective lens | Entire optical system | Unit |
|---|---|---|---|---|---|---|
| Com. ex | Axial chromatic aberration | −25.56 | −5.99 | 0.29 | 0.09 | μm/nm |

Table 4 shows the amount of change in outgoing angle per light source unit wavelength for each of the collimating lens 3 and the diffractive lens 4 for the first example and the comparative example. θ1 represents the amount of change in the outgoing angle of a bundle of rays per 1-nm change in the wavelength of the light source for each of the collimating lens 3 and the diffractive lens 4 when the objective lens 5 and the diffractive lens 4 of the first example are integrally shifted by 150 μm in a track direction of the information recording medium 6. θ2 similarly represents the amount of change in the outgoing angle of a bundle of rays for the comparative example.

TABLE 4

|  | Collimating lens | Diffractive lens | Unit |
|---|---|---|---|
| θ1 | 0.001 | 0.590 | min/nm |
| θ2 | 0.470 | 0.697 | min/nm |

Further, Table 5 shows the amount of displacement of the spot in a focal track direction per light source wavelength unit change for the first example and the comparative example. D1 represents the amount of displacement of a spot position of the information recording medium 6 in a track direction at a focal point per 1-nm change in light source wavelength when the objective lens 5 and the diffractive lens 4 of the first example are integrally shifted by 150 μm in a disk track direction. D2 similarly represents the amount of displacement of a spot position for the comparative example.

TABLE 5

|  | Amount of displacement of spot | Unit |
|---|---|---|
| D1 | 0 | mm |
| D2 | 17.5 | mm |

In the first example, chromatic aberration in the collimating lens 3 is sufficiently corrected, and the amount of chromatic aberration correction for the diffractive lens 4 is large and thus a chromatic aberration overcorrection condition exists. On the other hand, in the comparative example, the collimating lens 3 is large and thus a chromatic aberration overcorrection condition exists, and the amount of chromatic aberration correction for the diffractive lens 4 is smaller than that for the first example. Thus, it can be seen that, as shown in Table 4, the degree of divergence/convergence of a bundle of outgoing rays from the collimating lens 3 and the diffractive lens 4 increases in proportion to the chromatic aberration. As shown in FIG. 5, even if the optical pickup devices have the same chromatic aberration in the entire optical system, the amount of displacement of the spot in the disk track direction greatly varies due to the difference in the distribution of the amount of chromatic aberration correction. In the first example, the amount of displacement of the spot is 0.0 nm per 1 nm; i.e., substantially no spot displacement occurs. Therefore, stable recording and reproduction can be performed. In the comparative example, the spot is abruptly moved by as much as 17.5 nm per 1-nm wavelength, and thus there is a high risk of causing off-track errors.

It is desirable that the color of the aforementioned collimating lens 3 be sufficiently corrected; if color correction is not sufficiently done, substantially parallel rays coming from the collimating lens 3 cause divergence or convergence as a result of the wavelength change. This amount of change in angle affects the amount of displacement of the spot if the objective lens 5 is shifted.

Under present circumstances, when the amount of shift of the objective lens 5 is 150 μm, if the wavelength is changed by 1 nm, the amount of displacement of the spot in the disk track direction at which stable tracking can be performed is considered to be less than 10 nm.

If a color overcorrection condition or a color undercorrection condition exists, the amount of change in the angle of a bundle of outgoing rays from the light source per unit wavelength change becomes large. That is, when a change in the wavelength of the light source occurs, the angles of the divergence and convergence of a bundle of outgoing rays become large, and even if the diffractive lens 4, which is an aberration correcting element, and the objective lens 5 are shifted in a coaxial state at all times, because light enters the moving part of the diffractive lens 4 and the objective lens 5 from off-axis points, the amount of movement of the spot at a focal point in the track direction becomes large.

According to the first example, it is possible to correct large axial chromatic aberration which occurs as a result of an abrupt change in the wavelength of the light source in a short wavelength region. In addition, even if the aforementioned wavelength change occurs when the optical axis is shifted in the track direction of an information recording medium because of the objective lens performing tracking, it is possible to suppress the amount of movement of the spot at a focal point in the track direction of the information recording medium. That is, the first example has a large amount of axial chromatic aberration correction and a large amount of magnification chromatic aberration correction. On the other hand, although the comparative example has the same amount of axial chromatic aberration correction as the first example, the amount of magnification chromatic aberration correction is small.

As described above, according to the optical pickup lens device of the first embodiment, by appropriately distributing the amount of chromatic aberration correction for each of a collimating means and an aberration correcting element, even if the wavelength of the light source is quickly changed when the objective lens is shifted from the optical axis because of tracking, it is possible to suppress the displacement of the spot not only in the axis direction but also in the disk track direction to a minimum. Hence, the optical pickup lens device according to the first embodiment can suppress the risk of causing off-track errors. Namely, the optical pickup lens device according to the first embodiment can suppress the amount of displacement of the spot, which is magnification chromatic aberration, while correcting large axial chromatic aberration occurring in the objective lens due to a short wavelength region and a high numerical aperture NA.

SECOND EMBODIMENT

An optical pickup lens device according to a second embodiment will be described below. As conventional techniques of correcting chromatic aberration in a lens device of an optical pickup device, Japanese Laid-Open Patent Publications No. 7-294707 and No. 11-337818 propose an objective lens which performs chromatic aberration correction using a diffractive lens structure having a multitude of zones formed concentrically. Japanese Laid-Open Patent Publications No. 7-294707 and No. 11-337818 propose the production of an objective lens by an injection molding method using a resin material for the purpose of forming a diffractive lens structure in an objective lens with high accuracy and at a low cost.

An objective lens described in Japanese Laid-Open Patent Publication No. 7-294707 is supposed to be used for a bundle of rays with a wavelength of 780 nm. An objective lens described in Japanese Laid-Open Patent Publication No. 11-337818 is supposed to be used for a bundle of rays with a reference wavelength of 650 nm. If the objective lenses described in Japanese Laid-Open Patent Publications No. 7-294707 and No. 11-337818 are used for a bundle of rays with wavelengths in a short wavelength region, such as a bundle of rays with a reference wavelength of 420 nm or less, the number of zones required to obtain a sufficient chromatic aberration correction effect increases and the widths of the zones decrease. This is because, as described above, with an increase in the wavelength dependency of the refractive index of a lens material in the short wavelength region, the amount of chromatic aberration to be corrected increases.

In the objective lens described in Japanese Laid-Open Patent Publications No. 7-294707 and No. 11-337818, if the number of zones increases and the widths of the zones decrease, the production of an objective lens becomes very difficult. First, if the number of zones increases and the widths of the zones decrease, it is difficult to form a mold for injection molding which conforms to such a fine pattern. Even if the formation of the mold is possible, it is difficult to sufficiently transfer a fine mold pattern because of the viscosity of a resin, or the like. Consequently, if the objective lenses described in Japanese Laid-Open Patent Publications No. 7-294707 and No. 11-337818 are used for a bundle of rays with wavelengths in the short wavelength region, such as a bundle of rays with a reference wavelength of 420 nm or less, it is difficult to produce an objective lens according to the design values, and thus ends up providing only such an objective lens that causes a considerable loss in the amount of light due to pattern deviations.

In view of the foregoing problems, an object of the second embodiment is to provide an optical pickup lens device which provides easy production and high performance even if used for a bundle of rays with wavelengths in the short wavelength region, such as a bundle of rays with a reference wavelength of 420 nm or less, and an aberration correcting element used in such a lens device. Another object of the second embodiment is to provide an optical pickup device having the aforementioned lens device.

One of the aforementioned objects is achieved by an aberration correcting element described below. An aberration correcting element for allowing a bundle of incident rays to be transmitted therethrough has a diffractive surface having an optical power to deflect a bundle of rays by diffraction; and a phase step surface disposed at a location different from that of the diffractive surface and including a plurality of zone regions defined by concentric circles with the optical axis of a bundle of rays being at the center, and phase steps each formed at a boundary portion between the regions. The phase steps each generates a phase difference of an integer multiple of $2\pi$ radians with respect to the reference wavelength, between a bundle of rays transmitted through different regions.

Since the aberration correcting element according to the second embodiment has the above-described structure, an element can be provided which does not cause spherical aberration with respect to a bundle of rays with the reference wavelength but causes spherical aberration with respect to a bundle of rays with wavelengths displaced from the reference wavelength. By allowing this spherical aberration and spherical aberration in the diffractive surface to synergistically work together, desired large spherical aberration can be generated without forming a multitude of zones on the diffractive surface and without reducing the widths of the zones.

Preferably, the phase steps each generates a phase difference of $2\pi$ radians with respect to the reference wavelength, between a bundle of rays transmitted through different regions. Since the aberration correcting element according to the second embodiment has the above-described structure, without causing high-order aberration, only third-order spherical aberration in particular can be corrected.

Preferably, the width of the regions in a direction orthogonal to the optical axis decreases as the distance from the optical axis increases. Since the aberration correcting element according to the second embodiment has the above-described structure, it is possible to correct spherical aberration whose amount rapidly increases as the distance from the optical axis increases, which is caused in particular by a high NA objective lens.

Preferably, the phase step surface is an aspherical surface in which the optical surfaces of the regions are defined by different aspherical surface definitional equations. Since the aberration correcting element according to the second embodiment, in which different regions have different optimal aspherical surfaces, has the above-described structure, different regions can have different optimal aspherical surfaces, and thus spherical aberration at the reference wavelength can be corrected solely by the aberration correction element.

Preferably, the aberration correcting element includes a lens element having a diffractive surface; and a lens element having a phase step surface. For example, the aberration correcting element may be composed of a single lens element with one surface having formed thereon a diffractive surface and the other surface having formed thereon a phase step surface. Since the aberration correcting element according to the second embodiment has the above-described structure, molding and assembly and adjusting upon production are facilitated, and interfacial reflection occurring at a boundary surface is prevented from occurring.

One of the aforementioned objects is achieved by a lens device described below. A lens device is used in an optical pickup device which performs at least one of reading, writing, and erasing of information by converging a bundle of rays emitted from a light source onto an optical information recording medium to form a spot, includes, in the order from the light source side to the optical information recording medium side, an aberration correcting element for allowing a bundle of rays emitted from a light source to be transmitted therethrough; and an objective lens system for converging a bundle of rays coming from the aberration correcting element onto an information recording medium to form a spot. The aberration correcting element has a diffractive surface having an optical power to deflect a bundle of rays by diffraction; and a phase step surface disposed at a location different from that of the diffractive surface and including a plurality of zone regions defined by concentric circles with the optical axis of a bundle of rays being at the center, and phase steps each formed at a boundary portion between the regions. The phase steps each generates a phase difference of an integer multiple of $2\pi$ radians with respect to the reference wavelength, between a bundle of rays transmitted through different regions.

Since the lens device according to the second embodiment has the above-described structure, even if the oscillation wavelength is displaced from the reference wavelength due to large individual variations in a semiconductor laser used as a light source or a change in oscillation wavelength caused by temperature changes, it is possible to favorably form a spot by converging a bundle of rays onto an optical information recording medium.

Preferably, the lens device is used for a bundle of rays with a reference wavelength of 420 nm or less. Alternatively, preferably, the lens device is used for a bundle of rays having wavelengths in a range within several nanometers of the reference wavelength.

An optical pickup device for performing at least one of reading, writing, and erasing of information by converging a bundle of rays onto an optical information recording medium to form a spot, includes a light source for emitting a bundle of rays; a light converging section for converging the bundle of rays emitted from the light source to form a spot on an optical information recording medium; a separation section for separating a bundle of rays reflected by the optical information recording medium from an optical path of a bundle of rays from the light source to the light converging section; and a light receiving section for receiving the bundle of rays separated by the separation section. The light converging section includes a lens device having an aberration correcting element for allowing a bundle of rays emitted from the light source to be transmitted therethrough; and an objective lens system for converging a bundle of rays coming from the aberration correcting element onto an information recording medium to form a spot. The aberration correcting element has a diffractive surface having an optical power to deflect a bundle of rays by diffraction; and a phase step surface disposed at a location different from that of the diffractive surface and including a plurality of zone regions defined by concentric circles with the optical axis of a bundle of rays being at the center, and phase steps each formed at a boundary portion between the regions. The phase steps each generates a phase difference of an integer multiple of $2\pi$ radians with respect to the reference wavelength, between a bundle of rays transmitted through different regions.

Since the optical pickup device according to the second embodiment has the above-described structure, even if the oscillation wavelength is displaced from the reference wavelength due to large individual variations in a semiconductor laser used as a light source or a change in oscillation wavelength caused by temperature changes, it is possible to favorably record information on an optical information recording medium, erase information from the optical information recording medium, or read information from the optical information recording medium, without causing tracking errors.

According to the second embodiment, it is possible to provide an optical pickup lens device which provides easy production and high performance even if used for a bundle of rays with wavelengths in the short wavelength region, such as a bundle of rays with a reference wavelength of 420 nm or less, and an aberration correcting element used in such a lens device. In addition, according to the second embodiment, it is possible to provide an optical pickup device having the aforementioned lens device. The second embodiment will be described below with reference to the drawings.

Figure 7:
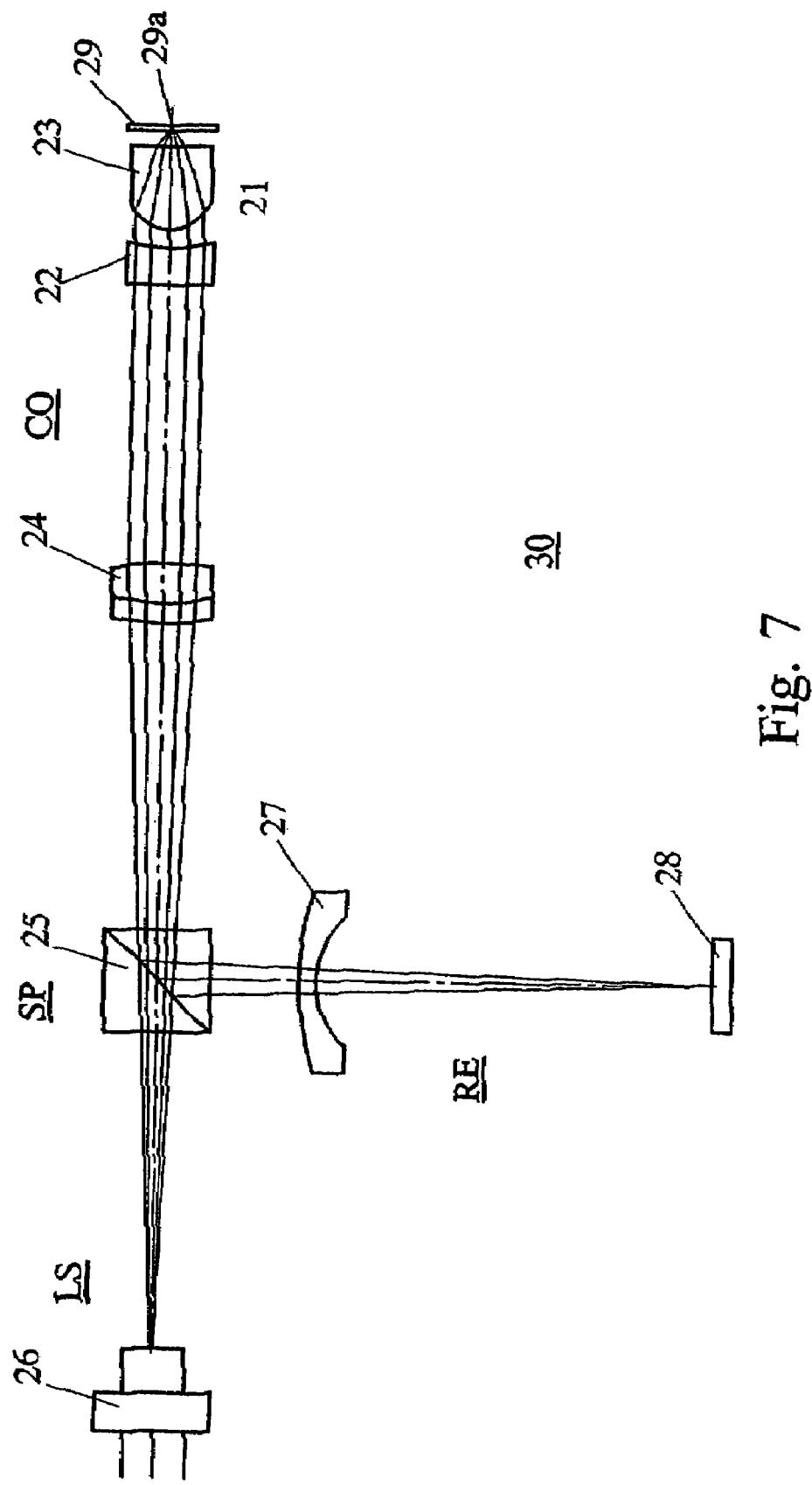
FIG. 7 is a schematic structure diagram of an optical pickup device according to a second embodiment.

FIG. 7 is a schematic structure diagram of an optical pickup device according to the second embodiment. An optical pickup device 30 according to the second embodiment includes a light source section LS, a light converging section CO, a separation section SP, and a light receiving section RE. The light source section LS is composed of a semiconductor laser 26. The semiconductor laser 26 emits a leaser light with a reference wavelength of 410 nm. The light converging section CO is composed of a collimating lens 24 and a lens device 21. The collimating lens 24 is a cemented lens formed by cementing two lens elements together. The lens device 21 includes an aberration correcting element 22 and an objective lens 23. The structure of the lens device 21 will be described later. The separation section SP is composed of a beam splitter 25. The beam splitter 25 is formed by cementing together two prisms in the shape of a triangular prism with a bottom surface in the shape of a right isosceles triangle, and has an optical film, on a cemented surface, which has functionality to allow a certain proportion of a bundle of rays to be transmitted therethrough and reflect the rest of the bundle of rays.

The light receiving section RE includes a detection lens 27 and a light receiving element 28. The light receiving element 28 is a photodiode which converts a bundle of incident rays into an electrical signal according to the intensity. A plate-like member disposed on a side of the objective lens 23 which is not adjacent to the aberration correcting element 22 indicates part of an information recording medium 29 on which the optical pickup device 30 performs recording, reproduction, or erasing of information. The information recording medium 29 shows an information recording surface 29a onto which a bundle of rays are converged and a protective portion being present more on the light source side than the information recording surface 29a and being transparent with respect to a bundle of rays from the light source, and an illustration of a structure corresponding to a substrate is omitted.

In FIG. 7, a bundle of rays coming from the semiconductor laser 26 are transmitted through the beam splitter 25, and made into substantially parallel rays by the collimating lens 24 composed of a cemented lens and then come out. The bundle of rays made into substantially parallel rays are transmitted through the aberration correcting element 22 and then converged, as a spot, onto the information recording surface 29a of the information recording medium 29 by the objective lens 23.

The bundle of rays converged as a spot are reflected by pits with different reflectivities formed on the information recording surface 29a. The bundle of rays reflected by the pits formed on the information recording surface 29a are transmitted through the objective lens 23, the aberration correcting element 22, and the collimating lens 24 in this order and then reach the beam splitter 5. The bundle of rays are reflected by the beam splitter 25 and then transmitted through the detection lens 27. Further, the bundle of rays form a spot on a light receiving surface of the light receiving element 28 disposed at a light convergence position which is adjusted by the detection lens 27. The light receiving element 28 converts the change in the amount of the bundle of rays modulated by the information recording surface 29a into an electrical signal. The optical pickup device reads data stored on the optical information recording medium, using the electrical signal outputted from the light receiving element 28.

Figure 8:
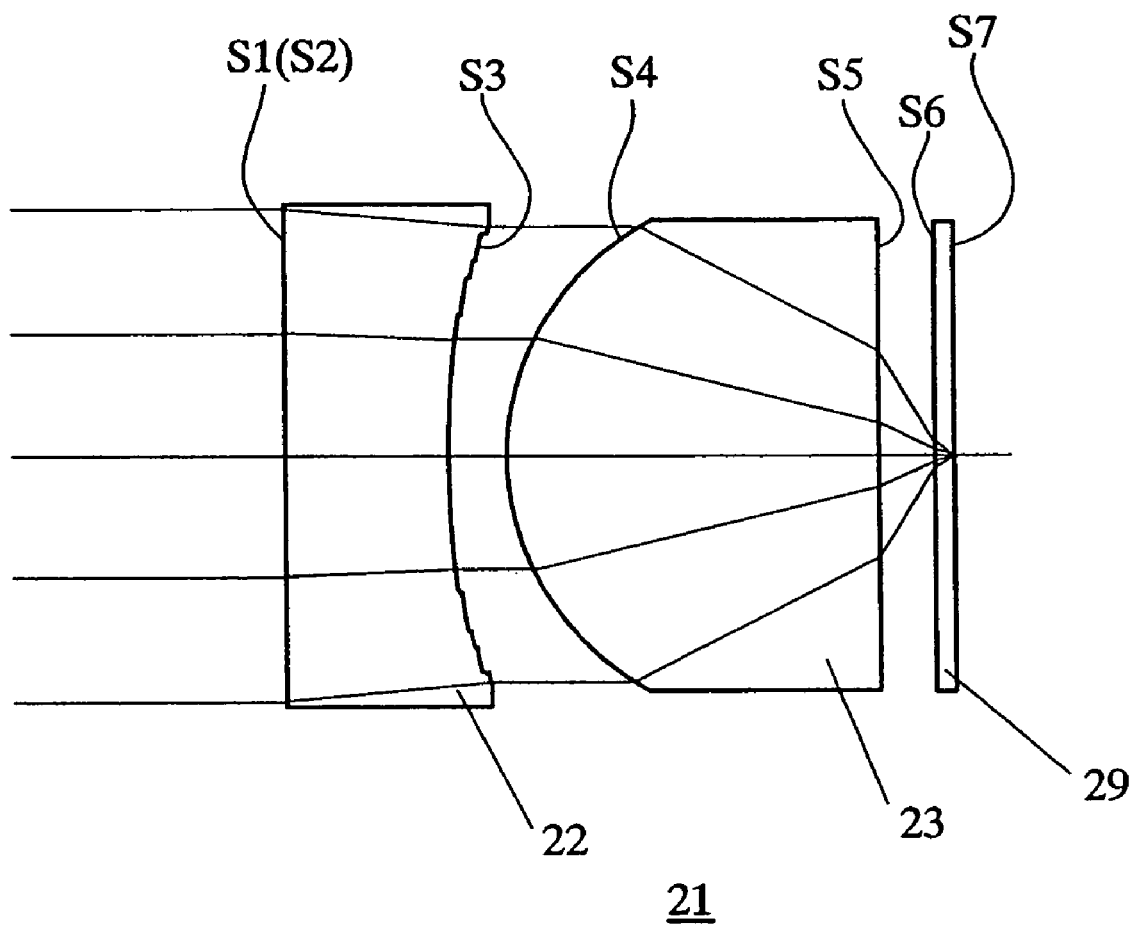
FIG. 8 is a schematic structure diagram showing a lens device used in the optical pickup device according to the second embodiment.

FIG. 8 is a schematic structure diagram showing a lens device used in an optical pickup device according to the second embodiment. An aberration correcting element 22 includes, in the order from the light source side, a diffractive surface S1 and a phase step surface S3, and is a lens made of a resin. An objective lens 23 has a refractive surface S4 on the light source side and a refractive surface S5 on the optical information recording medium side.

The diffractive surface S1 functions as an optical surface with a positive power for generating diffraction rays from incident rays entering the surface, and then converging the diffraction rays. The diffractive surface S1 has a diffraction efficiency set such that the amount of + first-order diffraction rays becomes maximum. The phase step surface S3 functions as an optical surface with a negative power with respect to diffraction rays, and has a power having an absolute value equal to the absolute value of the positive power of the diffractive surface S1. Consequently, the aberration correcting element 22 has no power with respect to a bundle of rays with the reference wavelength, and if a bundle of parallel rays enters the aberration correcting element 22, the aberration correcting element 22 allows the bundle of parallel rays to come out as a bundle of parallel rays.

Figure 9:
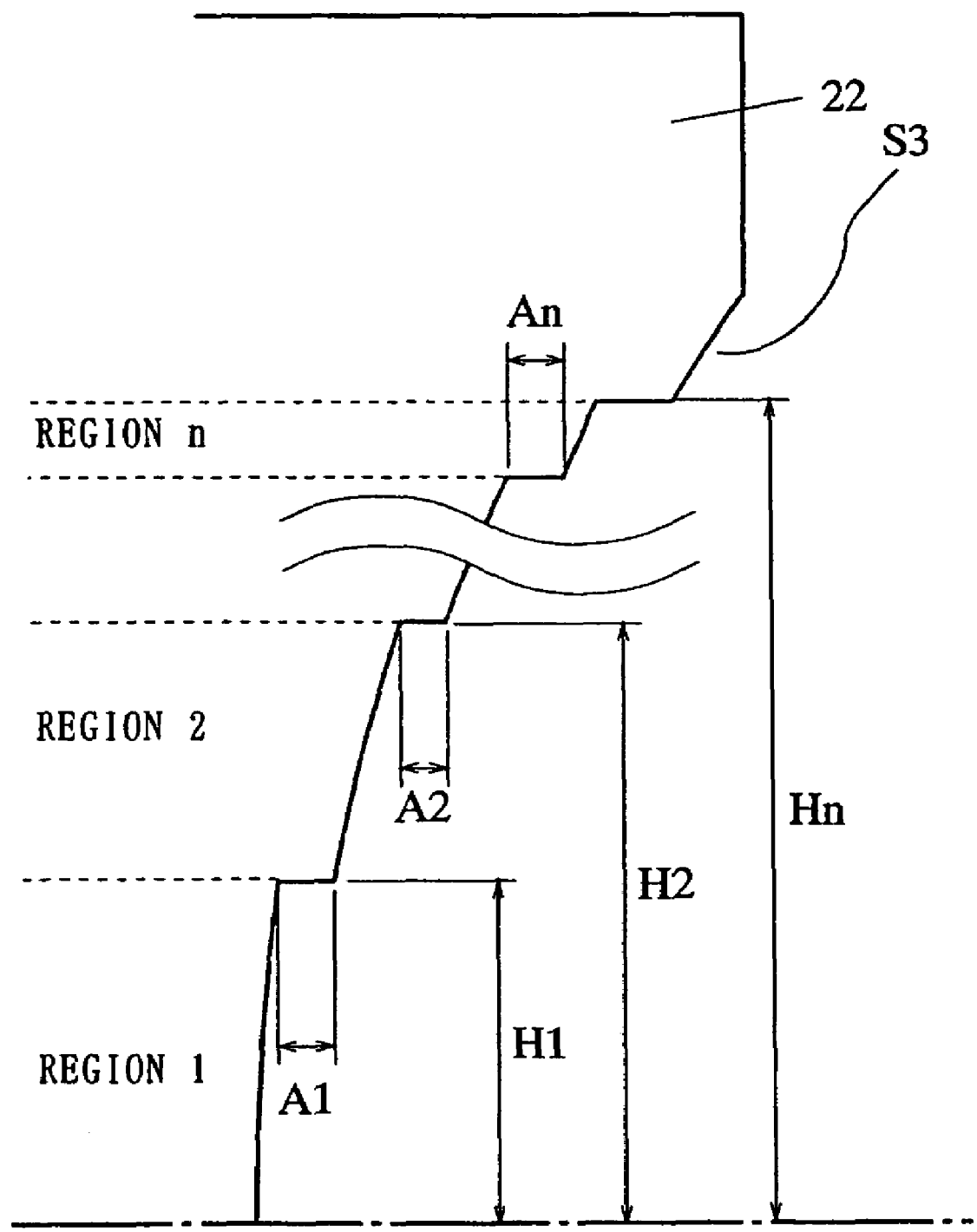
FIG. 9 is a schematic diagram showing a structure of a phase step surface of an aberration correcting element of the lens device used in the optical pickup device according to the second embodiment.

FIG. 9 is a schematic diagram showing the structure of a phase step surface of an aberration correcting element of a lens device used in an optical pickup device according to the second embodiment. A phase step surface S3 includes a plurality of zone regions defined by concentric circles with the optical axis of a bundle of rays being at the center, and phase steps each formed at a boundary portion between the regions. In FIG. 9, the center which includes the optical axis is referred to as region 1, and the radius of the region 1 is referred to as H1. In the following, the zone regions formed from the optical axis toward the periphery are referred to as region 2, region 3, . . . and region n, in the order from the optical axis side. The outside diameter of the region 2 is referred to as H2, the outside diameter of the region 3 to H3, and the outside diameter of the region n to Hn. The magnitude of a step between the regions 1 and 2 in a direction along the optical axis is referred to as A1, the magnitude of a step between the regions 2 and 3 in the direction along the optical axis is referred to as A2, and the magnitude of a step between the regions n−1 and n in the direction along the optical axis is referred to as An.

The aberration correcting element 22 used in the lens device according to the second embodiment has five zone regions. Boundary portions between the regions are configured such that the magnitude of the boundary portions in the direction along the optical axis increases by an integer multiple of $\lambda_0/(n_0-1)$ (which is q in the present embodiment), where $\lambda_0$ is the reference wavelength of the semiconductor laser 26 entering the lens device, and $n_0$ is the refractive index of a resin material of the aberration correcting element 22 with respect to light with wavelength $\lambda_0$.

The value of q is equal to the phase of $2\pi$ radians of the reference wavelength of the semiconductor laser 26. Consequently, the phase difference between two different rays transmitted through the phase step surface S3 becomes an integer multiple of $2\pi$, and thus the phase step surface S3 does not change spherical aberration in a bundle of rays transmitted through the phase step surface S3. The objective lens 23 performs aberration correction on the reference wavelength; therefore, when a bundle of rays with the reference wavelength enter the objective lens 23, the objective lens 23 forms a favorable spot on the information recording surface 29a of the information recording medium 29.

Now, the case is considered where the wavelength at which the semiconductor laser 26 oscillates is changed by several nanometers from the reference wavelength due to individual variations between the elements, temperature changes, or the like. Here, the oscillation wavelength of the semiconductor laser 26 displaced from the reference wavelength is denoted by $\lambda_1$, and the refractive index of the resin material with respect to wavelength $\lambda_1$ is denoted by $n_1$. Under these conditions, the phase difference between two different rays transmitted through the phase step surface S3 can be expressed by $2\pi q\lambda_0(n_1-1)/((n_0-1)\lambda_1)$. Since this value deviates from an integer multiple of $2\pi$ with respect to the wavelength changed by several nanometers from the reference wavelength, a bundle of rays transmitted through the phase step surface S3 generates spherical aberration.

Spherical aberration occurring in the phase step surface S3 can be adjusted by how the radius of each region formed on the phase step surface S3 is set with respect to the effective aperture of the optical system, and what shape the surface of each region takes. Therefore, if the wavelength of a bundle of rays at which the semiconductor laser 26 oscillates is displaced by several nanometers from the reference wavelength, the tendencies of spherical aberration occurring in the diffractive surface S1 and spherical aberration occurring in the phase step surface S3 can be designed to be in the same direction and to be in the opposite direction of spherical aberration generated by the objective lens 23. By thus designing, it becomes possible to generate large aberration solely by the aberration correcting element 22 without forming a multitude of zones on a peripheral portion of the diffractive surface S1 and without reducing the widths of the zones, as in the case where spherical aberration is generated only by the diffractive surface S1. By compensating spherical aberration between the aberration correcting element 22 and the objective lens 23, a substantial image point position on the optical axis can be corrected, and consequently, axial chromatic aberration can be corrected.

By making both surfaces of the aberration correcting element 22 to be diffractive surfaces, too, it is possible to generate large spherical aberration without forming a multitude of zones on the diffractive surface and without reducing the widths of the zones. However, if both surfaces are made to be diffractive surfaces, among a bundle of rays transmitted through the aberration correcting element, a loss in the amount of light used to form a spot on the optical information recording surface increases and thus it is not desirable. Hence, as in the lens device according to the embodiment, it is desirable that one surface of the aberration correcting element 22 be made to be a diffractive surface and the other surface be made to be a phase step surface.

Note that although the magnitude of the steps between regions formed on the phase step surface S3 in a direction along the optical axis is set such that a phase difference of an integer multiple of $2\pi$ radians occurs between a bundle of rays with the reference wavelength transmitted through different regions, the value of the integer can be appropriately set according to desired characteristics. For example, if the value is set so as to provide a phase difference corresponding to $2\pi$ radians, the amount of displacement from $2\pi$ of a phase difference occurring upon displacement from the reference wavelength by several nanometers decreases. Therefore, to take a large amount of aberration correction, it is necessary to deepen the steps to increase a phase difference.

By contrast, if the depth of the phase steps is increased, unnecessary high-order spherical aberration increases, degrading the entire aberration; thus, if only third-order spherical aberration needs to be corrected, it is desirable that the depth of the phase steps be set to a value corresponding to a phase difference of $2\pi$ which is the minimum necessary.

Note that although the aberration correcting element 22 described in the second embodiment is a lens element into which the diffractive surface S1 and the phase step surface S3 are integrally formed, the aberration correcting element 22 is not limited thereto. For example, the aberration correcting element 22 may be a combination of a lens element having only a diffractive surface and a lens element having only a phase step surface. However, taking into consideration molding and assembly and adjusting upon production and interfacial reflection occurring at a boundary surface, it is desirable that the aberration correcting element 22 be composed of an integrally-formed single lens element.

In addition, it is desirable that the aberration correcting element 22 and the objective lens 23 be integrally held together and integrally movable by an actuator.

It is desirable that the aberration correcting element 22 have regions whose width in a direction orthogonal to the optical axis decreases as the distance from the optical axis increases. In the case where the objective lens is composed of a single lens element and is used at a high NA such as an NA of 0.8, the objective lens has characteristic that the amount of spherical aberration occurring upon displacement from the reference wavelength by several nanometers abruptly increases as the distance from the optical axis in a direction orthogonal to the optical axis increases. To correct this characteristic, it is also necessary to increase the amount of spherical aberration caused in the aberration correcting element 22 toward the periphery. Therefore, it is desirable that, since the number of phase steps also needs to be increased toward the periphery, the width of the regions in the direction orthogonal to the optical axis decrease toward the periphery.

In the case where the optical surfaces of the regions are connected to each other with phase steps, the phase step surface maybe an aspherical surface defined by a single aspherical surface definitional equation or may be an aspherical surface defined by different aspherical surface definitional equations. Note, however, that it is desirable that the phase step surface be an aspherical surface defined by different aspherical surface definitional equations for the following reason. As compared with an aberration correcting element having regions defined by a single aspherical surface definitional equation, an aberration correcting element having different optimal aspherical surfaces for different regions is able to correct spherical aberration at the reference wavelength solely by itself.

Specifically, in an aberration correcting element having regions defined by a single aspherical surface definitional equation, since the regions have different thicknesses in the optical axis direction, spherical aberration or an optical power component is generated even at the reference wavelength. On the other hand, in an aberration correcting element having different optimal aspherical surfaces for different regions, since the regions can be individually designed so as to prevent spherical aberration or an optical power component from being generated, it is possible to further improve the characteristics of a lens device.

The aberration correcting element 22 is most effective when the reference wavelength of the semiconductor laser 26 is 420 nm or less. Generally, in a short wavelength region in which the wavelength is 420 nm or less, since the dispersion of optical materials such as glass is very large, there is a tendency that axial chromatic aberration in the optical system also becomes very large. Hence, if the wavelength of the semiconductor laser is changed even slightly, large axial chromatic aberration may occur. If large axial chromatic aberration occurs, tracking may not be performed, and as a result, stable recording, erasing, and reproduction cannot be performed. If the aberration correcting element 22 is provided to a lens device used in such a wavelength region, even if the reference wavelength of the semiconductor laser 26 is changed, because axial chromatic aberration is corrected, stable tracking can be performed.

In the aberration correcting element 22, by appropriately designing the diffractive surface S1 or the phase step surface S3, it is possible to adjust spherical aberration occurring in the aberration correcting element and correct axial chromatic aberration caused by a lens device which can be used in the optical system other than an objective lens (e.g., the collimating lens 24, a protective layer provided on the information recording surface 29, etc.).

Although in the aberration correcting element 22 the order of diffraction to be designed is + first order, generally, any of ±m-th order (m: integer) may be used. Although in the lens device of the embodiment the objective lens 2 is described to be composed of a single lens, it may be composed of a plurality of combined lenses.

Although, in the lens device of the second embodiment, a bundle of parallel rays enter the aberration correcting element 22, a bundle of non-parallel rays may enter the aberration correcting element 22. Further, although in the lens device of the second embodiment a bundle of parallel rays is present between the aberration correcting element 22 and the objective lens 23, a bundle of non-parallel rays may be present. Although the aberration correcting element 22 has a diffractive surface disposed on the light source side and has a phase step surface disposed on the optical information recording medium side, it is also possible to dispose them the other way around such that the phase step surface is on the light source side and the diffractive surface is on the optical information recording medium side.

As described above, the aberration correcting element according to the second embodiment can generate spherical aberration with respect to a bundle of rays having wavelengths displaced from the reference wavelength, while not generating spherical aberration with respect to a bundle of rays having the reference wavelength. By allowing this spherical aberration and spherical aberration in the diffractive surface to synergistically work together, desired large spherical aberration can be generated without forming a multitude of zones on the diffractive surface and without reducing the widths of the zones. Further, the aberration correcting element according to the embodiment can be produced using a resin, which enables easy production.

By applying this aberration correcting element to a lens device, even if the oscillation wavelength is displaced from the reference wavelength due to large individual variations in a semiconductor laser used as a light source or a change in oscillation wavelength caused by temperature changes, it is possible to favorably form a spot by converging a bundle of rays onto an optical information recording medium.

Further, by applying this lens device to an optical pickup device, even if the oscillation wavelength is displaced from the reference wavelength due to large individual variations in a semiconductor laser used as a light source or a change in oscillation wavelength caused by temperature changes, it is possible to favorably record information on an optical information recording medium, erase information from the optical information recording medium, or read information from the optical information recording medium, without causing tracking errors.

SECOND NUMERICAL EXAMPLE

Regarding a lens device according to the second embodiment, a specific numerical example will be described below. An aberration correcting element 22 is designed such that for a design wavelength the reference wavelength is 410 nm. In addition, for a bundle of rays, a bundle of parallel rays are assumed to enter the aberration correcting element 22, the diameter of the bundle of parallel rays on the outgoing side is set to 2.21 mm at an incident surface of an objective lens 23. A phase grating formed on a diffractive surface is represented by an ultra-high refractive index method (for the ultra-high refractive index method, see William C. Sweatt: Describing holographic optical elements as lenses: Journal of Optical Society of America, Vol. 67, No. 6, June 1977).

The aspherical shape is given by the following (Eq. 2):

$$X = \frac{C_j h^2}{1 + \sqrt{1 - (1+k_j)C_j^2 h^2}} + \sum A_{j,n} h^n \quad \text{(Eq. 2)}$$

The meaning of each symbol is as follows:

X: distance of a point on an aspherical surface whose height from the optical axis is h, from a plane tangent to the vertex of the aspherical surface, h: height from the optical axis, Cj: curvature of the j-th surface of a lens at the vertex of the aspherical surface (Cj=1/Rj: Rj is the radius of curvature of the j-th surface), Kj: conic constant of the j-th surface of the lens, and Aj, n: n-th order aspherical coefficient of the j-th surface of the lens (j=3, 4, 5).

Table 6 provides numeric data about the lens device and optical information recording medium of the second numerical example. In Table 6, rj represents the radius of curvature of the j-th surface, dj represents the j-th axial distance between surfaces, n410 represents the refractive index of the medium with respect to a wavelength of 410 nm, and ν represents the Abbe constant.

TABLE 6

| | No. | Surface | r | d | n410 | ν |
|---|---|---|---|---|---|---|
| Aberration correcting element | 1 | s1 | 100000.000 | 0.000 | 4101.3141 | −3.45 |
| | 2 | s2 | Plane | 1.000 | 1.52256 | 56.4 |
| | 3 | s3 | 12.402000 | 2.000 | | |
| Objective lens | 4 | s4 | 1.089951 | 1.90681 | 1.77717 | 45.6 |

TABLE 6-continued

| | No. | Surface | r | d | n410 | ν |
|---|---|---|---|---|---|---|
| lens | 5 | s5 | −3.138721 | 0.2428 | | |
| Optical information recording medium | 6 | s6 | Plane | 0.100 | 1.61580 | 56.4 |
| | 7 | s7 | Plane | | | |

In the second numerical example, a surface of the aberration correcting element 22 on the light source side is made to be a diffractive surface S1 and a surface on the outgoing side, i.e., on the side of the objective lens 23, is made to be a phase step surface S3, and axial chromatic aberration in the objective lens 23 is corrected. In addition, in the second numerical example, the absolute value of the diffraction power of the diffractive surface S1 of the aberration correcting element 22 on the light source side and the refractive power of the phase step surface S3 on the objective lens side are made to be negative, and the absolute values are made to be the same, whereby the total optical power of the aberration correcting element 22 is made to be 0. Further, in the second numerical example, the lens device is designed such that first-order diffraction rays have the maximum amount of diffraction rays.

Table 7 shows numeric values indicating aspherical coefficients of a third surface S3, a fourth surface S4, and a fifth surface S5 of the second numerical example (see Table 6). Note that the third surface S3 is a surface defined by a single aspherical surface definitional equation when the surfaces are connected to each other with phase steps. Table 8 shows numeric values for the phase step surface S3 formed on the aberration correcting element 22.

TABLE 7

| 3rd surface | | 4th surface | | 5th surface | |
|---|---|---|---|---|---|
| k3 | −0.8360125 | k4 | 32.3466 | k5 | 0 |
| A3, 4 | 0.035208012 | A4, 4 | 0.24439222 | A5, 4 | −0.000020379 |
| A3, 6 | 0.035187945 | A4, 6 | 14.387668 | A5, 6 | 3.47975E−08 |
| A3, 8 | −0.091241412 | A4, 8 | −164.43004 | A5, 8 | −1.23535E−07 |
| A3, 10 | 0.14573377 | A4, 10 | 722.13658 | A5, 10 | 3.3379E−07 |
| A3, 12 | −0.077937629 | A4, 12 | −730.28298 | | |
| A3, 14 | −0.015357262 | A4, 14 | −3352.4269 | | |
| A3, 16 | 0.01649441 | A4, 16 | 7626.1256 | | |

TABLE 8

| Region | Radius (mm) | Phase step | Difference with respect to thickness (Step depth) (mm) |
|---|---|---|---|
| 1 | 0.60 | — | — |
| 2 | 0.78 | A2 | 0.000785 |
| 3 | 0.85 | A3 | 0.000785 |
| 4 | 0.94 | A4 | 0.000785 |
| 5 | 1.00 | A5 | 0.000785 |

As shown in Table 8, the phase step surface S3 has the same magnitude in the optical axis direction in regions 1 to 5 from optical axis P such that all of the steps (difference in thickness) the regions 1 and 2, between the regions 2 and 3, between the regions 3 and 4, and between the regions 4 and 5 provide a phase difference of 2π with respect to a wavelength of 410 nm.

Figure 10:
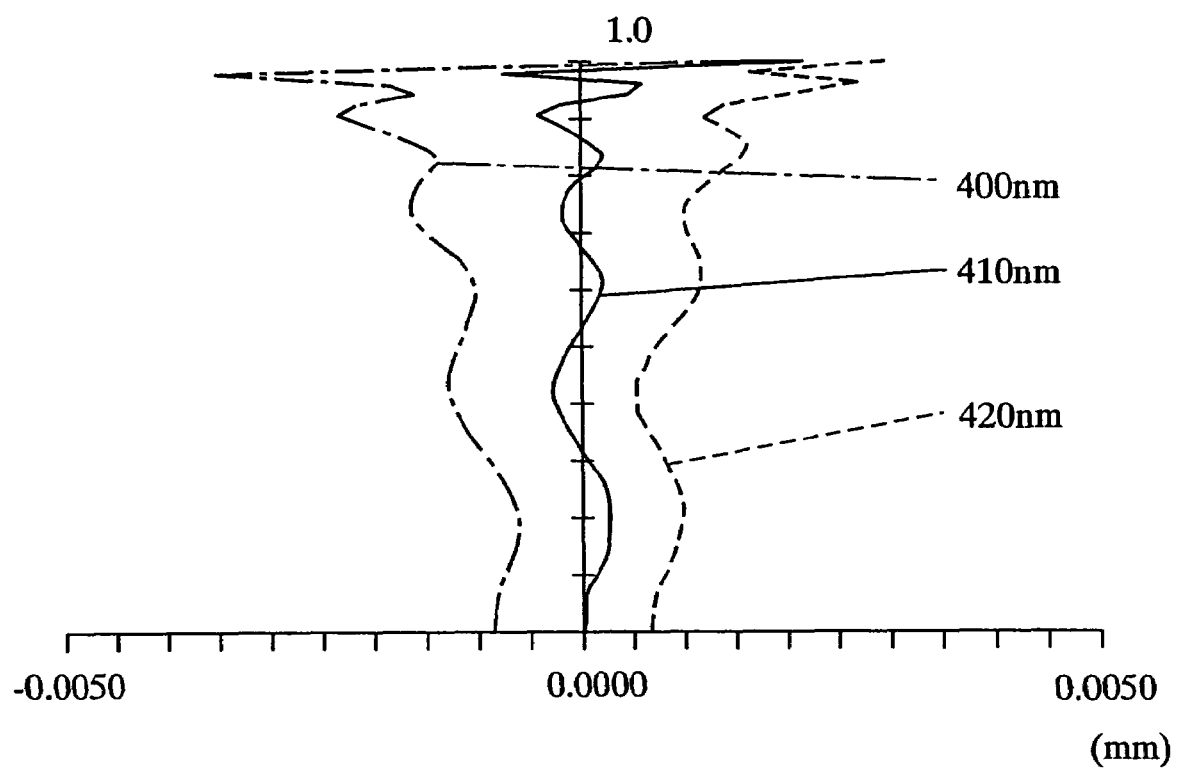
FIG. 10 is a graph showing spherical aberration in a lens device of a second numerical example at wavelengths of 410 nm±10 nm.

FIG. 10 is a graph showing spherical aberration in the lens device of the second numerical example at wavelengths of 410 nm±10 nm. In the drawing, the horizontal axis represents the length in the optical axis direction, and an axial image point for the case where the reference wavelength is 410 nm is taken as the point of origin. In addition, in the drawing, the vertical axis represents the radius of a bundle of parallel rays entering the aberration correcting element 22 and is normalized by an effective aperature. In FIG. 10, axial chromatic aberration corresponds to a distance between curves for the wavelengths on the horizontal axis. As can be verified from FIG. 10, in the lens device of the second numerical example, the displacement of a focus position in the optical axis direction shows almost no movement, regardless of wavelength.

The lens device of the second numerical example is compared with a lens device (comparative example) having the same conditions as the lens device of the second numerical example except for having no phase steps; the amount of defocus occurring at a focal point of the objective lens of the lens device of the second numerical example is reduced by about 4 mλ per 1-nm wavelength change in the neighborhood of 410 nm, and the amount of displacement of the focal point in the optical axis direction caused by wavelength changes is reduced by 0.013 μm per 1-nm change.

In the second numerical example, the amount of defocus and the amount of reduction in axial chromatic aberration can be further increased by increasing the number of regions in a phase step structure or by increasing the step depth so that the amount of phase difference is a multiple of two, three, ... of 2π. That is, in an element having a diffraction structure in which the amount of aberration correction is the same, by providing phase steps, the amount of chromatic aberration correction can be increased.

THIRD NUMERICAL EXAMPLE

A third numerical example uses the same structure as that of the second numerical example except for phase steps; as shown in Table 9, the step depth is set so as to provide a phase difference of an integer multiple of 2π with respect to a wavelength of 410 nm. Therefore, in the third numerical example, the steps do not have a uniform depth.

TABLE 9

| Region | Radius (mm) | Phase step | Difference with respect to thickness (Step depth) (mm) |
|---|---|---|---|
| 1 | 0.60 | — | — |
| 2 | 0.78 | A2 | 0.006280 |
| 3 | 0.85 | A3 | 0.005495 |
| 4 | 0.94 | A4 | 0.003925 |
| 5 | 1.00 | A5 | 0.003925 |

In a single objective lens 3, the NA is 0.8 or more, and the amount of spherical aberration occurring upon displacement from the reference wavelength by several nanometers increases rapidly toward the periphery. Therefore, it is also necessary to increase the amount of spherical aberration, which is caused to correct axial chromatic aberration, toward the periphery.

A lens device using an aberration correcting element 6 of the third numerical example is compared with a lens device (comparative example) having the same conditions as the lens device of the third numerical example except for having no phase steps; the amount of defocus occurring at a focal point of the objective lens of the device of the third numerical example is reduced by about 27 mλ per 1-nm wavelength change in the neighborhood of 410 nm, and the amount of displacement of the focal point in the optical axis direction caused by wavelength changes is reduced by 0.078 μm per 1-nm change.

The third numerical example describes that axial chromatic aberration can be favorably corrected by providing phase steps; however, since high-order spherical aberration also increases because of the phase steps, the total aberration is reduced to only about half its original value. To reduce the entire aberration, the number of regions may be increased. In particular, to reduce the change in third-order spherical aberration, a phase difference occurring in the aberration correcting element 22 maybe increased.

ANOTHER EMBODIMENT

The phase steps described in the second embodiment may be formed on the aberration correcting element of the first embodiment described above. By forming phase steps on the aberration correcting element of the first embodiment, a higher-performance optical pickup lens device can be provided.

INDUSTRIAL APPLICABILITY

The present invention is applicable to information recording and reproducing devices, etc., which perform writing, reproduction, or erasing on an information recording medium, such as a CD-ROM, a CD-R, a CD-RW, a DVD-ROM, a DVD-R, a DVD+R, a DVD-RW, a DVD+RW, an HD-DVD, or a Blu-Ray Disk. In particular, the present invention is suitable for use in information recording and reproduction devices, etc., which perform writing, reproduction, or erasing on a high-density recordable information recording medium which uses a bundle of rays with a wavelength of 420 nm or less, such as an HD-DVD or a Blu-Ray Disk which is the next generation DVD.

The invention claimed is:

1. A lens device used in an optical pickup device which performs at least one of reading, writing, and erasing of information by converging a bundle of rays emitted from a light source onto an optical information recording medium to form a spot, comprising:
   a diffractive surface having an optical power to deflect the bundle of rays by diffraction; and
   a phase step surface disposed on an optical axis of the bundle of rays at a location different from that of the diffractive surface, and including a plurality of zone regions defined by concentric circles with the optical axis of the bundle of rays being at a center and phase steps each formed at a boundary portion between the regions,
   wherein the phase steps each generates a phase difference of an integer multiple of 2π radians with respect to a reference wavelength, between a bundle of rays transmitted through different regions, and
   wherein the lens device has no power with respect to the bundle of rays with the reference wavelength.

2. The lens device in accordance with claim 1, wherein the phase steps each generates a phase difference of 2π radians with respect to the reference wavelength, between the bundle of rays transmitted through different regions.

3. The lens device in accordance with claim 1, wherein a width of the regions each in a direction orthogonal to the optical axis decreases as a distance from the optical axis increases.

4. The lens device in accordance with claim 1, wherein the phase step surface is an aspherical surface in which optical surfaces of the regions are defined by different aspherical surface definitional equations.

* * * * *